(12) United States Patent  (10) Patent No.: US 9,188,491 B2
Pan  (45) Date of Patent: Nov. 17, 2015

(54) SEMICONDUCTOR DEVICE INCLUDING A TEMPERATURE SENSOR CIRCUIT

(75) Inventor: Dong Pan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 13/615,245

(22) Filed: Sep. 13, 2012

(65) Prior Publication Data

US 2013/0003781 A1   Jan. 3, 2013

Related U.S. Application Data

(62) Division of application No. 12/818,889, filed on Jun. 18, 2010, now Pat. No. 8,292,503, which is a division of application No. 11/839,900, filed on Aug. 16, 2007, now Pat. No. 7,771,115.

(51) Int. Cl.
   *G01K 7/01* (2006.01)
   *G01K 7/16* (2006.01)

(52) U.S. Cl.
   CPC ... *G01K 7/01* (2013.01); *G01K 7/16* (2013.01)

(58) Field of Classification Search
   CPC .................................. G01K 7/01; G01K 7/10
   USPC ............ 374/1, 170, 178, 141, 183, 163, 171,
       374/172, 173; 327/512, 513, 108, 206, 205;
               326/32, 30, 86; 365/189.05, 211,
                       365/189.11; 713/171
   See application file for complete search history.

(56) References Cited

U.S. PATENT DOCUMENTS

| | | | |
|---|---|---|---|
| 4,035,787 A | | 7/1977 | Hornung |
| 4,369,352 A | | 1/1983 | Bowles |
| 4,970,497 A | | 11/1990 | Broadwater et al. |
| 5,085,526 A | | 2/1992 | Sawtell et al. |
| 5,278,796 A | | 1/1994 | Tillinghast et al. |
| 5,291,071 A | | 3/1994 | Allen et al. |
| 5,703,575 A | * | 12/1997 | Kirkpatrick .............. 340/870.17 |
| 6,217,213 B1 | | 4/2001 | Curry et al. |
| 6,275,422 B1 | * | 8/2001 | Javanifard et al. ....... 365/189.07 |
| 6,316,957 B1 | * | 11/2001 | Ang et al. ........................ 326/30 |
| 6,433,514 B1 | * | 8/2002 | McClure et al. .............. 320/136 |
| 6,442,500 B1 | | 8/2002 | Kim |
| 6,662,136 B2 | * | 12/2003 | Lamb et al. ................... 702/132 |
| 6,799,889 B2 | | 10/2004 | Pennock |
| 6,824,308 B2 | | 11/2004 | Sumimoto et al. |
| 6,838,331 B2 | | 1/2005 | Klein |
| 6,934,645 B2 | * | 8/2005 | Kim ............................... 702/64 |
| 7,027,343 B2 | | 4/2006 | Sinha et al. |
| 7,053,677 B2 | | 5/2006 | Yu et al. |

(Continued)

*Primary Examiner* — Gail Kaplan Verbitsky
(74) *Attorney, Agent, or Firm* — TraskBritt

(57) ABSTRACT

A semiconductor device including a temperature sensor includes a pull up circuit, a pull down circuit, a first additional current path, and a second additional current path. The pull up circuit is configured to generate a pull up current that contributes to generation of a first output current. The pull down circuit is operably coupled to the pull up circuit at an output node and configured to generate a pull down current that contributes to generation of a second output current. The first additional current path, when enabled, is configured to combine a first additional current with the pull up current to comprise the first output current. The second additional current path, when enabled, is configured to combine a second additional current with the pull down current to comprise the second output current. Respective enablement of the first additional current path and the second additional current path is complementary.

10 Claims, 6 Drawing Sheets

(56) References Cited

U.S. PATENT DOCUMENTS

| | | |
|---|---|---|
| 7,084,695 B2 | 8/2006 | Porter |
| 7,375,576 B2 | 5/2008 | Groiss |
| 7,410,293 B1 * | 8/2008 | Santurkar et al. ............. 374/178 |
| 7,417,464 B2 * | 8/2008 | Crawford ........................ 326/89 |
| 7,560,974 B2 * | 7/2009 | Noh et al. ..................... 327/534 |
| 7,564,219 B2 * | 7/2009 | Choi et al. .................... 320/128 |
| 7,771,115 B2 * | 8/2010 | Pan ................................ 374/170 |
| 7,782,078 B2 | 8/2010 | Koo |
| 7,786,778 B1 * | 8/2010 | Mannoorittathu et al. ... 327/170 |
| 7,891,868 B2 | 2/2011 | Sohn |
| 7,956,638 B2 | 6/2011 | Iizuka et al. |
| 8,023,354 B2 * | 9/2011 | Jeong ......................... 365/225.7 |
| 8,035,413 B2 * | 10/2011 | Millar ............................. 326/30 |
| 8,292,503 B2 * | 10/2012 | Pan ................................ 374/170 |
| 8,633,733 B2 * | 1/2014 | Dettloff et al. ................. 326/82 |
| 8,664,981 B2 * | 3/2014 | Kimura et al. ................ 327/108 |
| 8,793,091 B2 * | 7/2014 | Ku et al. ......................... 702/99 |
| 8,847,623 B2 * | 9/2014 | Millar ............................. 326/30 |
| 2002/0018513 A1 | 2/2002 | Curry et al. |
| 2002/0158674 A1 * | 10/2002 | Ang et al. ..................... 327/108 |
| 2003/0058732 A1 * | 3/2003 | Nam ............................. 365/233 |
| 2005/0127967 A1 * | 6/2005 | Allen ............................ 327/170 |
| 2006/0017457 A1 * | 1/2006 | Pan et al. ........................ 326/32 |
| 2006/0083094 A1 | 4/2006 | Sinha et al. |
| 2006/0197550 A1 * | 9/2006 | Mauthe et al. ................. 326/30 |
| 2006/0220707 A1 * | 10/2006 | Kang et al. ................... 327/112 |
| 2006/0242447 A1 * | 10/2006 | Radhakrishnan et al. .... 713/501 |
| 2007/0210756 A1 * | 9/2007 | Choi et al. .................... 320/128 |
| 2007/0274147 A1 * | 11/2007 | Egerer ......................... 365/222 |
| 2008/0031303 A1 | 2/2008 | Bowden et al. |
| 2008/0122478 A1 | 5/2008 | Mei |
| 2009/0046761 A1 | 2/2009 | Pan |
| 2009/0259425 A1 * | 10/2009 | Ku et al. ....................... 702/104 |
| 2009/0295458 A1 | 12/2009 | Kameyama et al. |
| 2010/0008160 A1 * | 1/2010 | Lee ......................... 365/189.09 |
| 2010/0254427 A1 | 10/2010 | Pan |
| 2011/0182321 A1 | 7/2011 | Yoshizaki et al. |
| 2012/0201273 A1 * | 8/2012 | Mukherjee ..................... 374/183 |

* cited by examiner

# US 9,188,491 B2

SEMICONDUCTOR DEVICE INCLUDING A TEMPERATURE SENSOR CIRCUIT

CROSS-REFERENCE TO RELATED APPLICATION

This application is a divisional of application Ser. No. 12/818,889, filed Jun. 18, 2010, now U.S. Pat. No. 8,292,503, issued Oct. 23, 2012, which is a divisional of Ser. No. 11/839,900, filed Aug. 16, 2007, now U.S. Pat. No. 7,771,115, issued Aug. 10, 2010, the entire disclosure of each of which is hereby incorporated herein by this reference.

FIELD

Embodiments of the present invention relate generally to temperature sensors and, more particularly, to determining temperature by obtaining a linear output of temperature values.

BACKGROUND

In modern high frequency integrated circuits, operating temperature has become increasingly important. Generally, semiconductor devices are specified to operate in a certain temperature range within which the device has been characterized. Additional heat created on a semiconductor device due to higher operating frequencies may affect power consumption and system performance. Temperature sensors may be implemented in a device to report the current temperature to a controller, which may modify operational parameters that affect temperature such as temporarily adjusting clock rate or running the device in a different power mode. These adjustments may bring the temperature back within the desired temperature range for the device and the operational parameters may then be returned to their previous values.

For semiconductor devices such as Dynamic Random Access Memory (DRAM) devices, a temperature sensing circuit may be used to monitor temperature in order to control the refresh rate of the memory cells. With DRAM devices, a charge representing stored data may be lost due to leakage, and therefore must be periodically refreshed since charge leakage is very dependant on temperature. As operating temperature is variable, maintaining a constant refresh rate may result in either data loss or a waste of power if the refresh rate is performed at a different rate than the temperature demands. As temperature increases, charge leakage also increases, and the memory cell charge must be refreshed more frequently. As temperature decreases, charge leakage also decreases, and refreshing may be performed less frequently. As a result of these problems, it is important that a temperature sensor accurately and efficiently determine the current operating temperature.

One conventional approach to temperature sensing includes comparing an output voltage (Vout) of a circuit to a reference voltage (Vref) and enabling a switch if the output voltage (Vout) is greater than the reference voltage (Vref). By monitoring the percentage of times (X %) that the switch is enabled, a number or measure of output counts can be calculated and stored in a counter, which may be set to represent, for example, one count per 1° Celsius. The temperature then may be calculated by comparing the number or measure of output counts in the counter by some offset constant.

As a result, there is a need for a temperature sensor that can more efficiently obtain a set of linear temperature readings while adding little additional circuitry.

DETAILED DESCRIPTION

In the following description, embodiments of a circuit and a method are set forth for a temperature-sensing algorithm in both non-linear and linear forms. Also as set forth are embodiments of a circuit and method implementing an algorithm to overcome shortcomings of both conventional non-linear and conventional linear algorithms. In the following detailed description, reference is made to the accompanying drawings which form a part hereof, and in which is shown, by way of illustration, specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the present invention.

In this description, circuits and functions may be shown in block diagram form in order not to obscure the present invention in unnecessary detail. Furthermore, specific circuit implementations shown and described are only examples and should not be construed as the only way to implement the present invention unless specified otherwise herein. Block definitions and partitioning of logic between various blocks represent a specific implementation. It will be readily apparent to one of ordinary skill in the art that the various embodiments of the present invention may be practiced by numerous other partitioning solutions. For the most part, details concerning timing considerations, and the like, have been omitted where such details are not necessary to obtain a complete understanding of the present invention in its various embodiments and are within the abilities of persons of ordinary skill in the relevant art.

Figure 1:
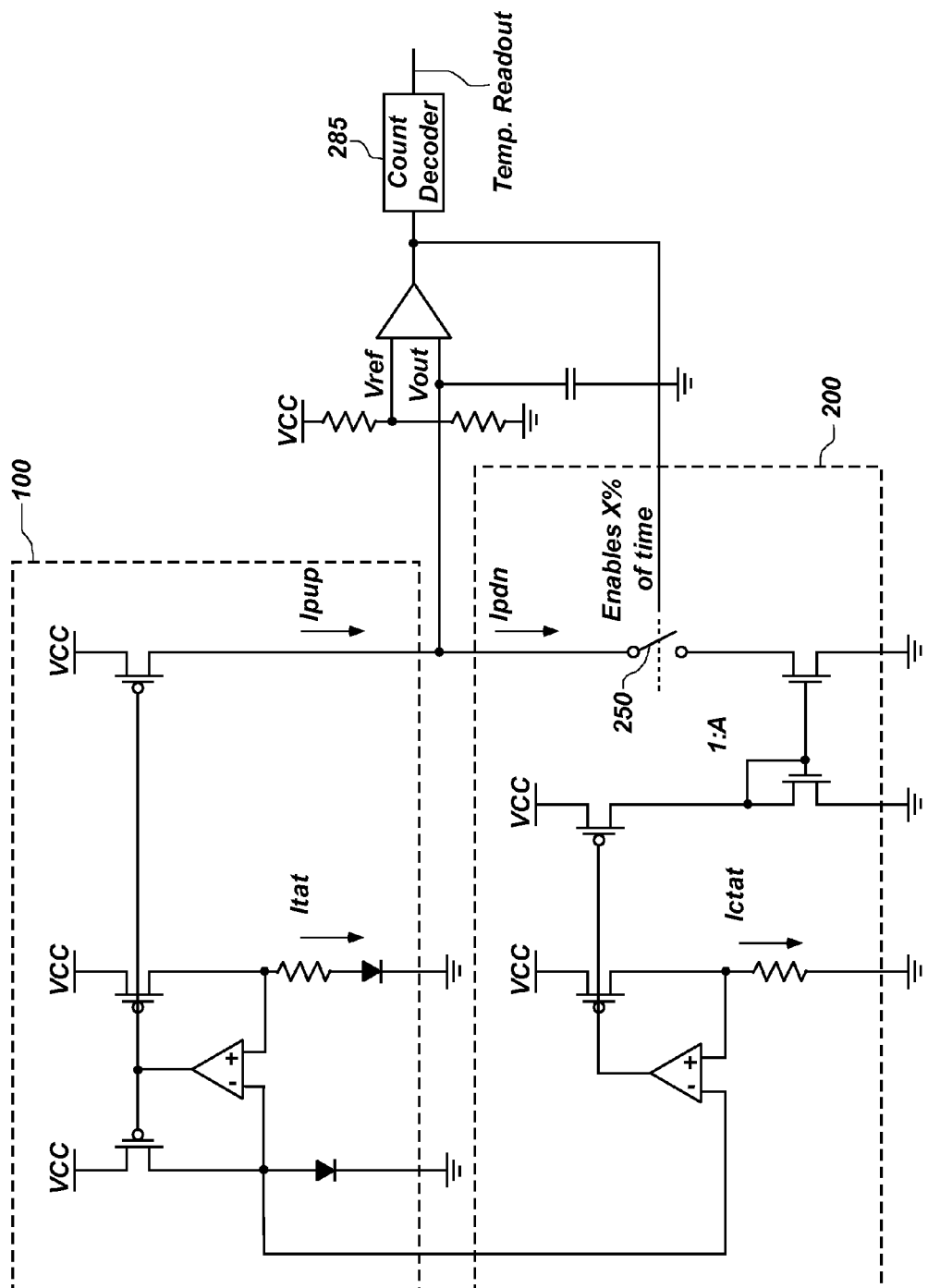
FIG. 1 is a circuit diagram of a temperature sensor.

FIG. 1 is a circuit diagram of a temperature sensor 50 including a pull up circuit 100 that generates a pull up current (Ipup) and a pull down circuit 200 that generates a pull down current (Ipdn). The average value of the pull down current (Ipdn) is defined as the value of Ipdn with the switch 250 enabled multiplied by the percentage of time (X %) that the switch 250 is enabled. Temperature sensor output data is generated and stored in a counter and decoder module 285 as a ratio of the number of times (Output Counts) that the switch 250 is enabled to a full cycle of readings (Total Clocks) in order to generate a final temperature estimate signal (TempReadout). The temperature estimate signal (TempReadout) can be further interpreted by external circuitry to modify operational parameters, such as DRAM refresh rate, in response to a determined temperature change. An example of such external circuitry is a refresh controller that adjusts the refresh rate of a memory device based upon the current temperature information provided by the temperature estimate signal (TempReadout).

As an example, if a measure of Output Counts are set to represent 1° Celsius per count, the temperature estimate signal (TempReadout) can be determined by:

TempReadout=Output Counts−Counts Offset where:
  Output Counts=Enbl*Total Clocks.
  where:
    Enbl is the decimal equivalent of X %, i.e., X %/100; and
    Total Clocks a measure of units of time.
By the nature of a delta sigma converter:

$I$pup=Enbl*$I$pdn therefore:

Enbl=$I$pup/$I$pdn and where:

$I$pup=$n*Vt*\ln K/R1$ $I$pdn=$A*Vd1/L*R1$ solving for Enbl:

Enbl=$I$pup/$I$pdn=$(n*Vt*\ln K*L)/(A*Vd1)$ therefore:

Output Counts=$(n*Vt*\ln K*L)/(A*Vd1)$*Total Clocks where n is a process constant parameter substantially close to 1, Vt is the thermal voltage of the transistors in the pull up circuit 100 and the pull down circuit 200, and Vd1 is the one-times diode forward biasing voltage.

Accordingly, when temperature increases, Vt increases at a rate of approximately 0.085 mV/° C., and Vd1 decreases at a rate of approximately −1.63 mV/° C. in a typical process. For a typical process where, for example, the values of L=6, K=24, A=1.33, the Total Clocks to obtain a measure of Output Counts that are 1° Celsius per count is 245.

Figure 2:
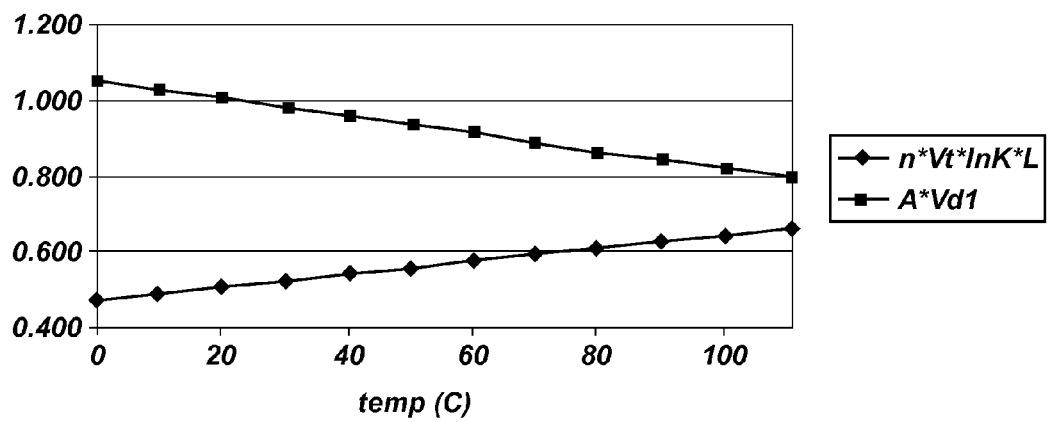
FIG. 2 is a graph illustrating variations of coefficients across a temperature range for a non-linear temperature algorithm.

According to the equations above with this temperature sensor, the numerator parameter of Enbl, $(n*Vt*\ln K*L)$, will increase when temperature increases and the denominator parameter of Enbl, $(A*Vd1)$, will decrease when temperature increases. Both numerator and denominator parameters will be linear across the temperature when viewed separately as is represented in FIG. 2. However, when combining both parameters to form Enbl, $(n*Vt*\ln K*L)/(A*Vd1)$, Enbl will not be linear. As a result, when combining Enbl with the Total Clocks, the Output Counts will also be nonlinear as is shown in FIG. 3.

Figure 3:
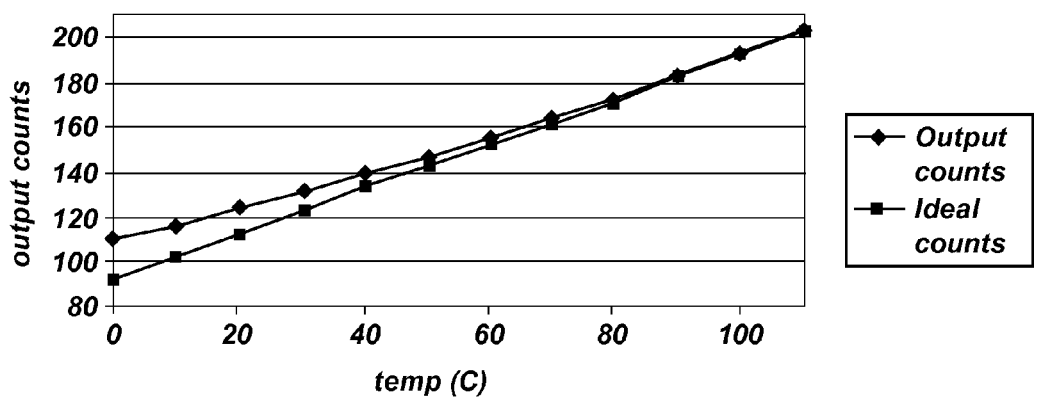
FIG. 3 is a graph illustrating a measure of temperature sensor counts compared to a plot of a measure of ideal counts of a non-linear temperature sensor.

FIG. 3 is a graph illustrating a measure of a temperature sensor Output Counts compared with a plot of a measure of ideal counts across a temperature range for the non-linear temperature sensor 50. With these settings, Output Counts can change about 1° Celsius per count at temperatures near 90° Celsius. However, at low temperatures, the measure of Output Counts is no longer linear. In order to obtain a linear output, the Enbl needs to be linear across a range of temperatures. Accordingly, a linear voltage over a constant voltage is used. The constants A, L, and K of the temperature sensor 50 may be configured such that (Ipup+Ipdn) is the bandgap reference and is substantially constant across the temperature range. In order to generate a linear Enbl across the temperature range:

Set Enbl=$I$pup/($I$pup+$I$pdn)=$n*Vt*\ln K*L/(A*Vd1+n*Vt*\ln K*L)$ and configure constants A, K, and L such that:
  $(n*Vt*\ln K*L)$ is a positive value; and
  $(A*Vd1+n*Vt*\ln K*L)$ is constant.
  Accordingly, Enbl becomes linear across the temperature range when L=6, K=24, A=1 and the Total Clocks=735 for 1° Celsius per count.

Figure 4:
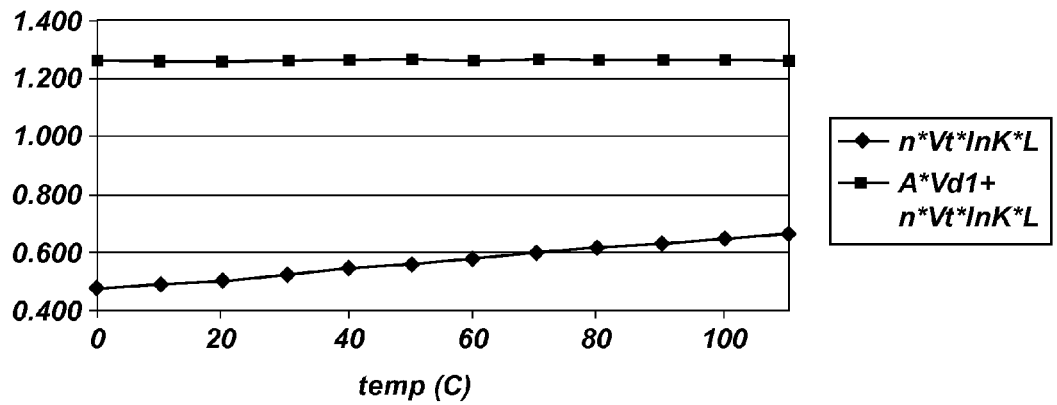
FIG. 4 is a graph illustrating coefficient variations of numerator and denominator coefficients varying across a temperature range for a linear temperature algorithm.

FIG. 4 is a graph illustrating coefficient variations of numerator and denominator coefficients varying across the temperature range for a linear temperature algorithm. In FIG. 4, the numerator parameter $(n*Vt*\ln K*L)$ and denominator parameter $(A*Vd1+n*Vt*\ln K*L)$ are separately graphed to illustrate the linear relationship therebetween. The numerator parameter, $(n*Vt*\ln K*L)$, increases linearly when the temperature increases and the first and second terms within the denominator parameter $(A*Vd1+n*Vt*\ln K*L)$ increase and decrease, respectively, at substantially the same rate resulting in a substantially constant denominator over the temperature range.

Figure 5:
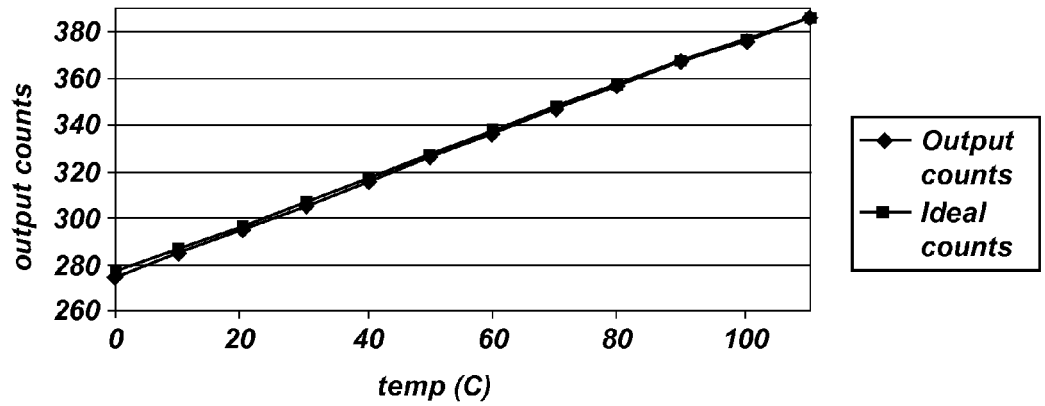
FIG. 5 is a graph illustrating a measure of temperature sensor output counts compared to a plot of a measure of ideal counts of a temperature sensor when a measure of total clocks is increased and the measure of output counts is linear across a temperature range.

FIG. 5 is a graph illustrating a measure of temperature sensor Output Counts compared to a plot of a measure of ideal counts as the measure of Total Clocks is increased resulting in the measure of Output Counts remaining linear across the temperature range. While such a configuration results in an increased temperature sensor accuracy across the temperature range, additional clocks, for example, 735 Total Clocks are needed to achieve the linear result when, for example, 245 Total Clocks were needed for the non-linear temperature sensor 50. Unfortunately, nearly three times as many units of time are required to obtain an accurate linear result according to such an approach.

The present embodiment utilizes an algorithm that solves the drawback of a conventional linear temperature sensor and a conventional non-linear sensor by obtaining a linear output without increasing the Total Clocks by setting:

Output Counts=Enbl*Total Clocks−Offset Constant
set: Enbl=3*$I$pup/($I$pup+$I$pdn)

Total Clocks is 245 for Output Counts to be 1° Celsius per count, then:

Output Counts=3*$I$pup/($I$pup+$I$pdn)*245−245 which simplifies to:

Output Counts=245*(2*$I$pup−$I$pdn)/($I$pup+$I$pdn)  (1)

Accordingly, the pull down current (Ipdn) and the pull up current (Ipup) may be set to increase and decrease inversely at substantially the same rate in order for the denominator portion of Equation (1), (Ipup+Ipdn), to be constant across the temperature range, and the numerator portion of Equation (1), (245*(2*Ipup−Ipdn)), to increase linearly across the temperature range.

Figure 6:
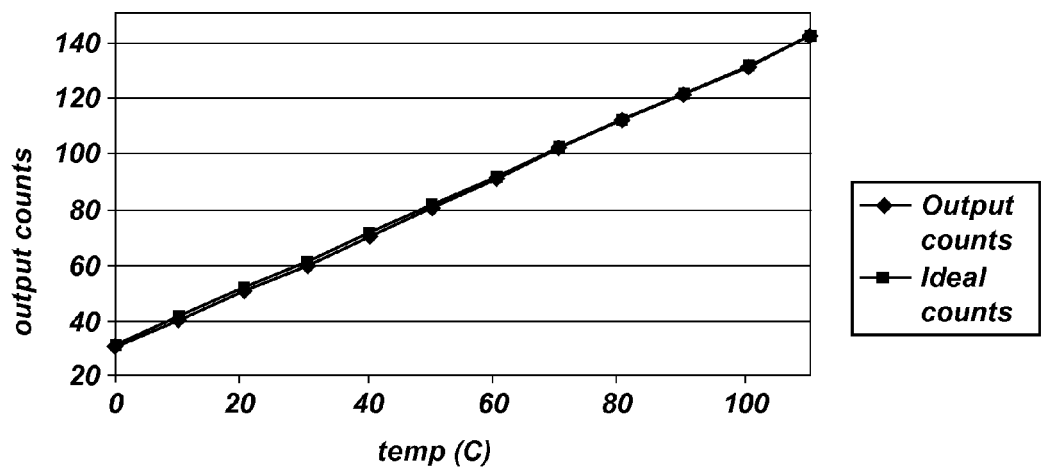
FIG. 6 is a graph illustrating a measure of temperature sensor counts compared to a plot of a measure of ideal counts of a temperature sensor, in accordance with an embodiment of the present invention.

FIG. 6 is a graph illustrating temperature sensor counts compared to a plot of a measure of ideal counts of a temperature sensor, in accordance with an embodiment of the present invention. Because the denominator is constant across the temperature range, and the numerator is linear across the temperature range, the output given by Equation (1) and illustrated in FIG. 6 is also linear across the temperature range.

Figure 7:
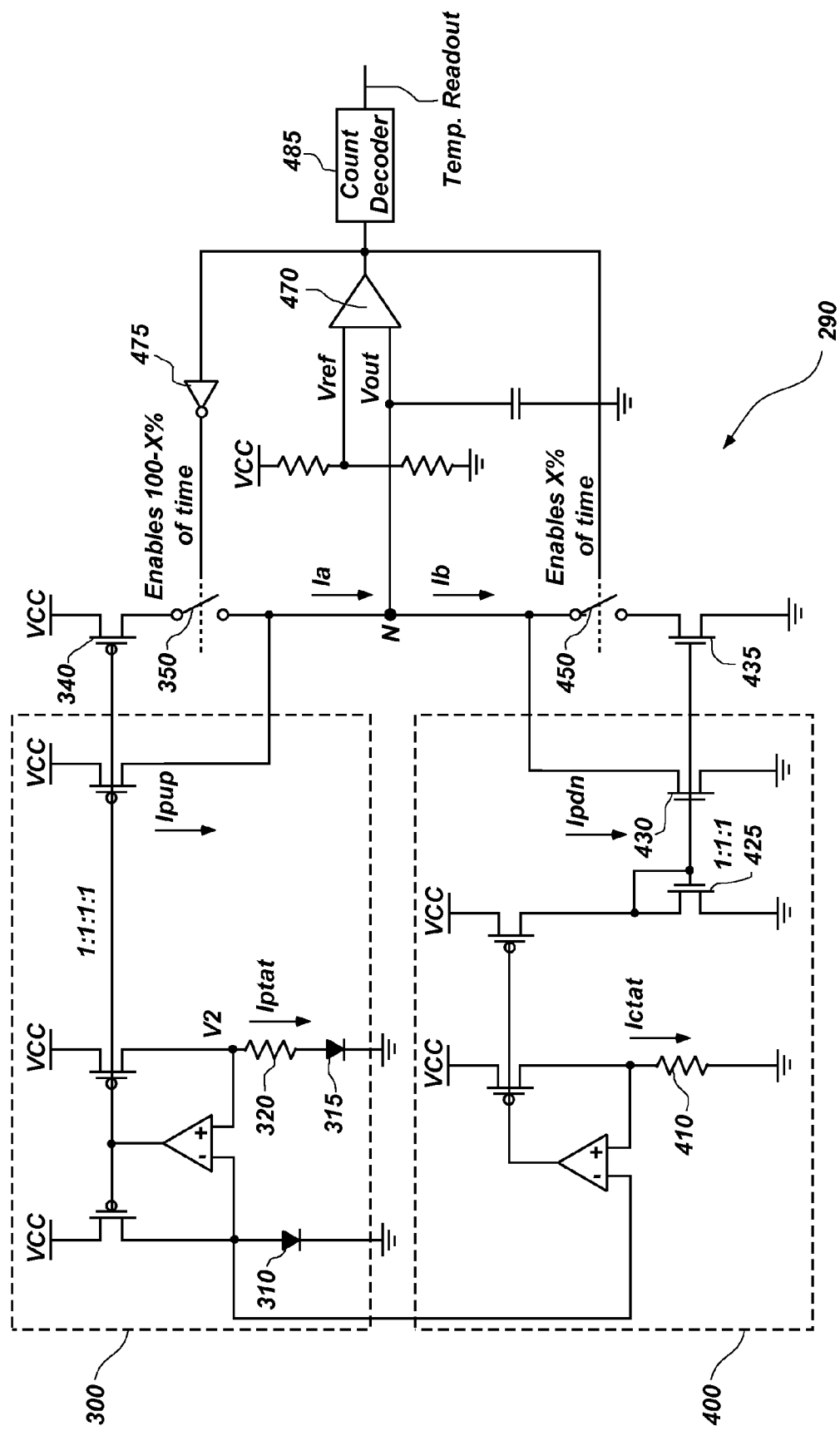
FIG. 7 is a circuit diagram of a temperature sensor, in accordance with an embodiment of the present invention.

FIG. 7 is a circuit diagram of a temperature sensor, in accordance with an embodiment of the present invention. In FIG. 7, a circuit realization of the above-described algorithm is illustrated in a temperature sensor circuit 290. Temperature sensor circuit 290 includes temperature sensitive circuit elements such as transistors, resistors, and diodes. Temperature sensor circuit 290 further includes a pull down circuit 400 that may be configured to generate a pull down current (Ipdn). This embodiment also includes a pull up circuit 300 that may create a pull up current (Ipup). The pull down circuit 400 includes a resistor 410, which is related to the resistance of a resistor 320 in the pull up circuit 300 by a constant (L). The pull down circuit includes at least one current mirror with transistors 425 and 430 with the at least one current mirror having a ratio (A). The pull up circuit 300 may include a first diode 310 and a second diode 315, wherein the size of the second diode 315 is related to the size of the first diode 310 by a constant (K). When temperature increases, thermal voltage (Vt) increases at a rate of approximately 0.085 mV/° C., and one-times diode forward biasing voltage (Vd1) decreases at a rate of approximately −1.63 mV/° C. in an illustrative process. Accordingly, the pull up current (Ipup) and pull down current (Ipdn) are:

$$Ipup=n*Vt*lnK/R1$$

$$Ipdn=A*Vd1/L*R1$$

where n is a process constant parameter substantially equal to 1.

The embodiment of FIG. 7 for temperature sensor circuit 290 may also include a first switch 350 serially coupled to a first transistor 340 with the first switch 350 and the first transistor 340 coupled in parallel with the pull up circuit 300. The current through the first transistor 340 is combined with the pull up current (Ipup) to form output current (Ia) at an output node (N). The temperature sensor circuit 290 may also include a second switch 450 serially coupled to a second transistor 435 with the second switch 450 and the second transistor 435 coupled in parallel with the pull down circuit 400. The current through the second transistor 435 is combined with the pull down current (Ipdn) to form output current (Ib) at the output node (N).

Comparator 470 compares an output voltage (Vout) to a reference voltage (Vref) in order to control enablement of the first switch 350 and the second switch 450. When output voltage (Vout) is greater than reference voltage (Vref), the second switch 450 is enabled and the first switch 350 is disabled. When reference voltage (Vref) is greater than output voltage (Vout), the first switch 350 is enabled and the second switch 450 is disabled. Inverter 475 causes the first switch 350 and the second switch 450 to be complementary enabled such that the second switch 450 is enabled a percentage of the time (X %), and the first switch 350 is enabled a percentage of the time (100−X %).

The temperature sensor output data is generated and stored in a counter and decoder module 485 as a ratio of the number of times (Output Counts) that the switch 350 is enabled to a full cycle of readings (Total Clocks) in order to generate a final temperature estimate signal (TempReadout). The temperature estimate signal (TempReadout) can be further interpreted by external circuitry to modify operational parameters, such as DRAM refresh rate, in response to the determined temperature change. An example of such external circuitry is a refresh controller that adjusts the refresh rate of a memory array on a memory device based upon the current temperature information provided by the temperature sensor circuit 290. If Output Counts are set to represent 1° Celsius per count, the temperature estimate signal (TempReadout) can be determined by:

TempReadout=Output Counts−Counts Offset where:
   Output Counts=Enbl*Total Clocks
      Enbl is the decimal equivalent of X %, i.e., Enbl=X %/100; and
      Total Clocks is a measure of units of time.

By nature of the delta sigma converter:

Ia=Ib where:

Ia=Ipup+(1Enbl)*Ipup

Ib=Ipdn+Enbl*Ipdn solving for Enbl and simplifying:

Enbl=(2*Ipup−Ipdn)/(Ipup+Ipdn)

solving for Output Counts:

Output Counts=Enbl*Total Clocks when setting Total Clocks=245:

$$\text{Output Counts}=245*(2*Ipup-Ipdn)/(Ipup+Ipdn) \quad (2)$$

Equation (2) shows an Output Counts that is on the same order as in Equation (1), which demonstrates that the circuit realization of the above algorithm results in a linear output generated with a quantity of Total Clocks being on the same order as the quantity of Total Clocks for the nonlinear output. Thus, the linear output over the temperature range with 245 Total Clocks is a major improvement over the conventional temperature sensor, which previously had to trade more Total Clocks for better linearity. Accordingly, the now-derived temperature estimate signal (TempReadout) can be used by other circuits or modules to modify behavior and operational parameters. The temperature estimate signal (TempReadout) may be configured as a group of signals indicating various temperature points where one of the signals is active at any given time indicating a current temperature. Alternatively, the temperature estimate signal (TempReadout) may be configured as an analog signal indicating the temperature.

Figure 8:
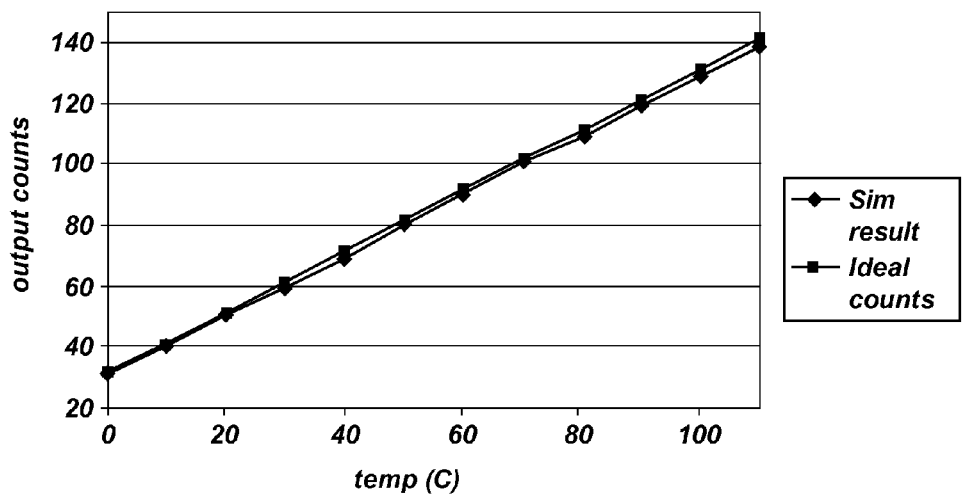
FIG. 8 is a graph illustrating a measure of temperature sensor counts that are linear across a temperature range compared to a plot of a measure of ideal counts of a temperature sensor, in accordance with an embodiment of the present invention.

FIG. 8 is a graph illustrating a measure of temperature sensor counts that are linear across a temperature range when compared to a plot of a measure of ideal counts of a temperature sensor, in accordance with an embodiment of the present invention. The plots illustrate simulation results of the circuit showing the measure of Output Counts of the simulated temperature sensor circuit 290 compared with the output for the algorithm from FIG. 6. As illustrated, the simulation results very closely approximate the linearity of the measure of ideal counts over the temperature range.

Figure 9:
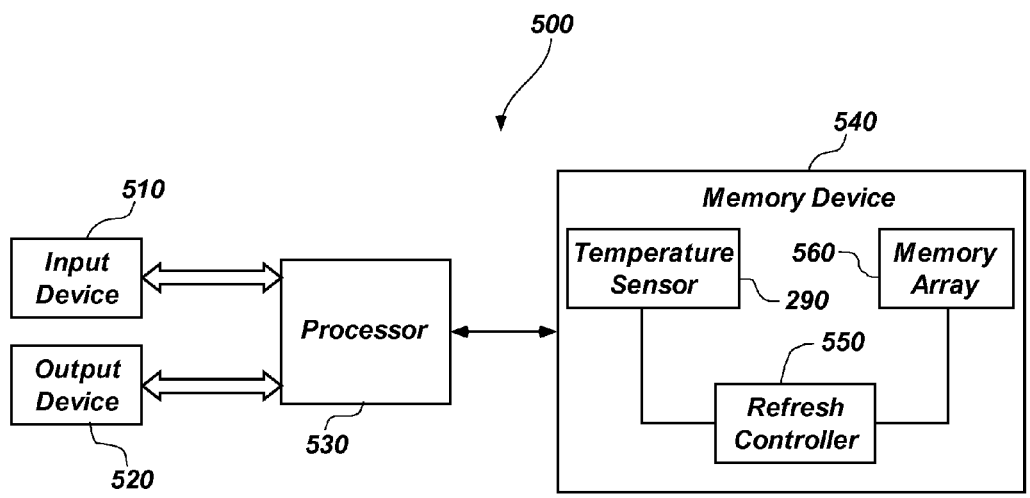
FIG. 9 is a diagram of an electronic system including a memory device having a temperature sensor, in accordance with an embodiment of the present invention.

FIG. 9 is a block diagram of an electronic system including a memory device having a temperature sensor, in accordance with an embodiment of the present invention. An electronic system 500 includes at least one of an input device 510 and an output device 520 and further includes at least one processor 530 and at least one memory device 540. The memory device 540 includes the temperature sensor circuit 290 as described herein in communication with a refresh controller 550 to control the refresh rate of a semiconductor memory array 560.

Figure 10:
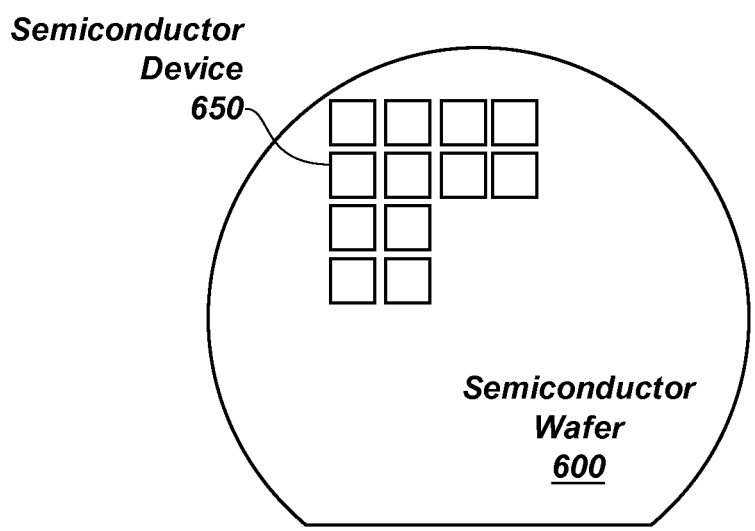
FIG. 10 is a diagram of a semiconductor wafer including a plurality of semiconductor devices including a temperature sensor, in accordance with an embodiment of the present invention.

FIG. 10 is a diagram of a semiconductor wafer including a plurality of semiconductor devices including at least one temperature sensor, in accordance with an embodiment of the present invention. A semiconductor wafer 600 includes a plurality of semiconductor devices 650 incorporating the temperature sensor circuit 290 (not shown in FIG. 10) as described herein. Of course, it should be understood that the plurality of semiconductor devices 650 may be fabricated on substrates other than a silicon wafer, such as, for example, a Silicon On Insulator (SOI) substrate, a Silicon On Glass (SOG) substrate, a Silicon on Sapphire (SOS) substrate, a gallium arsenide wafer, an indium phosphide wafer, or other bulk semiconductor substrate. As used herein, the term "wafer" includes and encompasses all such substrates.

CONCLUSION

Embodiments described herein disclose a temperature sensor device for obtaining a linear set of temperature readings over a temperature range while doing so with fewer units of time than with prior temperature sensing circuits. An embodiment disclosed herein comprises a pull down circuit configured to generate a pull down current, and a pull up circuit configured to generate a pull up current. The pull up circuit and pull down circuit are coupled to a plurality of switches configured to generate a first output current and a second output current. The pull up circuit and the pull down circuit each comprise temperature sensitive circuit elements such as resistors, transistors, and diodes.

In order to obtain a linear temperature reading over a range of temperatures, the temperature sensitive circuit elements may be configured such that the average values of the first output current and the second output current are substantially the same. The temperature sensitive circuit elements may also be configured such that the pull up current and the pull down current inversely change with temperature at substantially the same rate. A comparator, that compares a reference voltage and an output voltage, controls the enablement of the first switch and the second switch. The first switch and the second switch are complementary enabled in response to an output signal dependent on temperature such that the second switch is enabled a percentage of time (X %) and the first switch is enabled a percentage of time (100–X %).

Another embodiment disclosed herein comprises a method of sensing temperature, configuring a plurality of temperature sensitive circuit elements, such as resistors, transistors, and diodes to form a pull down circuit and a pull up circuit in order to generate a pull down current and a pull up current respectively. The method of sensing temperature further comprises comparing an output voltage with a reference voltage to control the enabling of a plurality of switches in a complementary manner. Configuring the plurality of temperature sensitive circuit elements further comprises forming a first output current and a second output current in such a manner that the average values of the first output current and the second output current are substantially equal. Configuring the plurality of temperature sensitive circuit elements further comprises having the pull up current and the pull down current set to change with temperature inversely at the same rate in order to obtain a linear temperature reading.

Another embodiment disclosed herein comprises a semiconductor device including at least one temperature sensor. Yet another embodiment comprises an electronic system including at least one input device, at least one output device, at least one processor, and at least one memory device. The at least one memory device and/or processor comprises at least one temperature sensor according to the present invention described herein. The at least one temperature sensor may communicate with a refresh controller which may control the refresh rate of a semiconductor memory array. Yet a further embodiment disclosed herein comprises at least one semiconductor device including at least one temperature sensor according to the present invention fabricated on a semiconductor wafer.

Although the foregoing description contains many specifics, these are not to be construed as limiting the scope of the present invention, but merely as providing certain exemplary embodiments. Similarly, other embodiments of the invention may be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims are encompassed by the present invention.

What is claimed is:

1. A semiconductor device, comprising:
 a temperature sensor including circuit elements a switch element and an output element, the temperature sensor configured to:
  generate a variable pull up output current and a variable pull down output current that vary responsive to temperature change of the circuit elements;
  alternatingly respectively switch additional pull up current and additional pull down current into the variable pull up output current and the variable pull down output current, respectively, as controlled according to a duty cycle that depends, at least in part, on a comparison of an output voltage to a reference voltage received by a comparator, the output voltage being generated at an output node of the circuit elements by the variable pull up output current and the variable pull down output current; and
  generate a temperature estimate signal indicating a temperature responsive to the comparison of the output voltage to the reference voltage.

2. The semiconductor device of claim 1, wherein average values of the variable pull up output current and the variable pull down output current are substantially equal.

3. The semiconductor device of claim 1, wherein the circuit elements are configured such that the variable pull up output current and the variable pull down output current change with temperature at substantially the same rate.

4. The semiconductor device of claim 1, further comprising a refresh controller in communication with the temperature sensor, the refresh controller configured to:
 monitor a temperature estimate signal from the temperature sensor; and
 modify, in response to the temperature estimate signal, a refresh rate of at least one memory device that includes the temperature sensor.

5. The semiconductor device of claim 1, wherein the temperature sensor includes:
- a pull up circuit configured to generate a pull up current (Ipup) that contributes to generation of the variable pull up output current (Ia);
- a pull down circuit operably coupled to the pull up circuit, the pull down circuit configured to generate a pull down current (Ipdn) that contributes to generation of the variable pull down output current (Ib);
- a first additional current path operably coupled to the output node of the circuit elements, wherein the first additional current path, when enabled, is configured to combine the additional pull up current with the pull up current (Ipup) to comprise the variable pull up output current (Ia); and
- a second additional current path operably coupled to the output node, wherein the second additional current path, when enabled, is configured to combine the additional pull down current with the pull down current (Ipdn) to comprise the variable pull down output current (Ib).

6. The semiconductor device of claim 5, wherein the first additional current, when the first additional current path is enabled, is approximately equal to the pull up current (Ipup), and wherein the second additional current, when the second additional current path is enabled, is approximately equal to the pull down current (Ipdn).

7. The semiconductor device of claim 6, wherein the variable pull up output current (Ia) and the variable pull down output current (Ib) have average values approximately equal to:
- Ia=Ipup+(1−Enbl)*Ipup; and
- Ib=Ipdn+Enbl*Ipdn, wherein Enbl is a decimal equivalent of the percentage of time that the second additional current path is enabled, and (1−Enbl) is a decimal equivalent of the percentage of time that the first additional current path is enabled.

8. The semiconductor device of claim 7, further configured to generate a temperature estimate signal in response to a result of the comparison of the output voltage at the output node and the reference voltage, wherein the temperature estimate signal is based, at least in part, on the number of times (Output Counts) that a single one of the first additional current path and the second additional current path is enabled for a full cycle of readings (Total Clocks).

9. The semiconductor device of claim 8, wherein the Output Counts are approximately equal to Output Counts=Total Clocks*(2*Ipup−Ipdn)/ (Ipup+Ipdn).

10. The semiconductor device of claim 1, further comprising an apparatus that incorporates the temperature sensor to which the temperature estimate signal is associated, wherein the apparatus is selected from the group consisting of a memory device, a semiconductor wafer, and an electronic system.

* * * * *

UNITED STATES PATENT AND TRADEMARK OFFICE
CERTIFICATE OF CORRECTION

| | | Page 1 of 1 |
|---|---|---|
| PATENT NO. | : 9,188,491 B2 | |
| APPLICATION NO. | : 13/615245 | |
| DATED | : November 17, 2015 | |
| INVENTOR(S) | : Dong Pan | |

It is certified that error appears in the above-identified patent and that said Letters Patent is hereby corrected as shown below:

In the specification:

COLUMN 1, LINE 5, change "APPLICATION" to --APPLICATIONS--

In the claims:

CLAIM 1, COLUMN 8, LINE 34, change "elements a switch" to --elements, a switch--

Signed and Sealed this
Twenty-third Day of February, 2016

Michelle K. Lee
*Director of the United States Patent and Trademark Office*